United States Patent
Decker

(10) Patent No.: US 11,266,967 B2
(45) Date of Patent: Mar. 8, 2022

(54) PROCESS FOR THE POSITIONING OF A CORROSION-RESISTANT COATING ON A WALL OF AN ITEM OF EQUIPMENT OF A FCC UNIT

(71) Applicant: Total Raffinage Chimie, Courbevoie (FR)

(72) Inventor: Sébastien Decker, Octeville sur Mer (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 853 days.

(21) Appl. No.: 15/773,497

(22) PCT Filed: Nov. 2, 2016

(86) PCT No.: PCT/EP2016/076339
§ 371 (c)(1),
(2) Date: May 3, 2018

(87) PCT Pub. No.: WO2017/076855
PCT Pub. Date: May 11, 2017

(65) Prior Publication Data
US 2021/0023521 A1 Jan. 28, 2021

(30) Foreign Application Priority Data
Nov. 4, 2015 (FR) ..................... 15 60559

(51) Int. Cl.
| F27B 15/06 | (2006.01) |
| B01J 8/18 | (2006.01) |
| C10G 11/18 | (2006.01) |
| C10G 75/00 | (2006.01) |
| F27D 1/14 | (2006.01) |

(52) U.S. Cl.
CPC ........... *B01J 8/1872* (2013.01); *B01J 8/1818* (2013.01); *C10G 11/18* (2013.01); *C10G 75/00* (2013.01); *F27B 15/06* (2013.01); *F27D 1/141* (2013.01)

(58) Field of Classification Search
CPC .......... B01J 8/1872; F27B 15/06; F27D 1/141
See application file for complete search history.

(56) References Cited

U.S. PATENT DOCUMENTS

| 4,753,053 A | * | 6/1988 | Heard | ..................... F27D 1/141 |
| | | | | 110/336 |
| 6,393,789 B1 | * | 5/2002 | Lanclos | .................. B04C 5/085 |
| | | | | 110/338 |

FOREIGN PATENT DOCUMENTS

| AT | 374917 B | * | 6/1984 | ............. F27D 1/141 |
| AT | 374917 B | | 6/1984 | |
| CA | 632486 A | | 12/1961 | |
| EP | 0180553 A1 | | 5/1986 | |
| WO | 2014009625 A1 | | 1/2014 | |
| WO | WO-2014009625 A1 | * | 1/2014 | ............. B32B 15/18 |

OTHER PUBLICATIONS

International Search Report issued in PCT/EP2016/076339, dated Feb. 6, 2017, 5 pages.

* cited by examiner

*Primary Examiner* — Randy Boyer
(74) *Attorney, Agent, or Firm* — Albert Shung

(57) ABSTRACT

The invention relates to a process for the positioning of a corrosion-resistant coating on an internal or external metal wall (20) of a fluid catalytic cracking unit chamber, comprising:

(i) the shaping of a metal anchoring structure (10) formed from a plurality of strips (12) assembled in pairs by joining assembly portions (121, 122) so as to form a plurality of cells (14), the anchoring structure comprising a plurality of fastening tabs (16) integral with strip portions other than assembly portions, (ii) the fastening of said anchoring structure (10) by welding the free edge (18) of a part at least of the fastening tabs to the metal wall (20), defining a space between a longitudinal edge (12*b*) of an anchoring structure and the metal wall, (iii) the insertion of a composite material into the cells (14) from the metal wall (20) and at least up to the upper longitudinal edge (12*a*) of each strip.

9 Claims, 3 Drawing Sheets

PROCESS FOR THE POSITIONING OF A CORROSION-RESISTANT COATING ON A WALL OF AN ITEM OF EQUIPMENT OF A FCC UNIT

CROSS-REFERENCE TO RELATED APPLICATIONS

This application claims the benefit of PCT/EP2016/076339 filed Nov. 2, 2016, which claims priority from FR 1560559 filed Nov. 4, 2015, which are incorporated herein by reference in their entireties for all purposes.

The invention relates to a process for the positioning of a corrosion-resistant coating on a wall of an item of equipment of a fluid catalytic cracking (FCC) unit.

The invention relates in particular to a process for the positioning of a corrosion-resistant coating on a wall on a region where the risk of erosion during the circulation of the catalyst, such as a cyclone wall, reactor platinum wall, stripper wall, riser (upward reactor) wall, downer (downward reactor) wall, the walls of standpipes (vertical pipes), disengager or withdrawal well walls, the walls of orifice chambers, or any other wall subject to erosion.

Fluidized-bed catalytic cracking (FCC) is a chemical process frequently used in oil refineries, the purpose of which is to convert heavy cuts comprising long hydrocarbon chains, for example resulting from the vacuum distillation of oil, into lighter and more upgradable cuts. The metal walls of the various chambers of an FCC unit, such as, for example, a reactor and a regenerator, and the metal walls of the internal items of equipment located in the regenerator when the reactor, in particular the cyclones, or the walls mentioned above, can undergo erosion due to the circulation of the catalyst particles and, in the regenerator, significant and rapid corrosion by the combustion gases. It is thus necessary to protect them in order to extend their lifetime.

The metal walls of the chambers and of the items of equipment internal to these chambers are thus covered with a coating intended to protect them mainly from erosion. Such coatings generally consist of a composite material, for example a concrete, held by an anchoring structure, which is usually metallic. These anchoring structures are welded to the metal walls and thus provide the attachment of the composite material. They can in particular exhibit a plurality of four- or six-sided cells. The anchoring structure is then welded to the metal wall to be protected by welding only some of the cells to the metal wall. Each cell is subsequently filled with composite material. This configuration of the coating also makes it possible to ensure the absorption of the expansion differences which exist between the metal anchoring structure and the composite material.

The cellular anchoring structures are generally formed of strips assembled in pairs, so as to define cells. Portions of strips are thus juxtaposed in regions of assembling of the structure.

Such a coating makes it possible to protect the metal walls of FCC units. However, over time, a degradation of this coating is observed which may lead to fragments of coating dropping inside the chambers or the internal items of equipment and require the shutdown of the installation in order to replace the coating.

The degradations observed may have several courses depending on the operating conditions of the chamber in question.

The reactor or the cyclones and separator located in the reactor, or also the transfer life of the product exiting from the reactor, are in contact with the gas resulting from the cracking of the feedstock. These gases get between the interstices of the coating and lead to the formation of coke inside the interstices, and more particularly at the junction of the strips of the anchoring structure. This formation of coke can lead to significant detachment of the coating during successive cooling/heating cycles of the chamber: this is because the gaps existing between the composite material and this anchoring structure are filled in by the coke, so that these shrinkage gaps can no longer play their role consisting in absorbing the differences in expansion between the anchoring structure and the composite material. This results in the formation of compression lines, cracks, failure of the welding bead, indeed even detachment of the composite material filling the cells. In particular, the gas penetrates via the cracks and reaches the welding bead, which can result in failure of the latter.

In a regenerator or in the internal items of equipment of a regenerator, in particular cyclones, but also in the line of the fuel gases at the outlet of the regenerator, and also in the orifice chambers, the metal walls are in contact with catalyst particles and with a gas containing, inter alia, oxygen and oxides of carbon, sulfur and nitrogen. This gas penetrates through the interstices of the coating and causes sulfidation, carbonization and oxidation phenomenon, in particular at the welds which fasten the metal anchoring structure to the metal walls, which phenomena can be propagated throughout the metal anchoring.

Irrespective of the degradation phenomena observed, corrosion, especially by sulfidation, carburization or oxidation, or formation of coke, the applicant company has observed that these phenomena essentially occur at the metal anchoring structure and/or its bonding via welding to the metal walls, and more particularly at juxtaposed strip portions of the anchoring structure.

Document EP 180 553 also states that a phenomenon of corrosion and of erosion is often observed at these spaces located between the juxtaposed strip portions, these spaces being created by the deformations resulting from the shaping into a cylinder or similar of the honeycomb anchoring structure. Corrosion/erosion is observed at these spaces since the composite material may find it difficult to penetrate therein. In order to solve this problem, document EP 180 553 proposes to produce omega ($\Omega$)-shaped cut-outs on the portions of strips which are not juxtaposed with another adjacent strip. These omega-shaped cut-outs are positioned so as to open onto the lower edge and onto the upper edge of the strip portion in question. Such cut-outs facilitate the shaping of the honeycomb structure and prevent the formation of the spaces at which corrosion/erosion is observed. Although the anchoring structure described in document EP 180 553 makes it possible to produce a reinforced coating in which the spaces between the strips forming the anchoring structure are of small size or nonexistent, the surrounding gases may however still penetrate between the strips of the structure and give rise to corrosion/coke formation at the interstices which exist between the strips of the anchoring structure and the metal wall to which the anchoring structure is welded.

Document CA632486 describes a honeycomb anchoring structure formed of juxtaposed strips, in which the heights of the juxtaposed and assembled strip portions are not the same, so that, when the composite material fills the cells, it covers the lowest strip height which makes it possible to limit the introduction of corrosive liquid between the two strips at their juxtaposition. The corrosion induced by the surrounding gases is not mentioned.

Document WO2014/009625A1 filed by the applicant company describes the process for producing a coating in which an anchoring structure exhibiting hexagonal cells welded to the wall at least their junctions between the juxtaposed portions of the strips forming the anchoring structure, in order to prevent the introduction of gases entities between the juxtaposed portions and to thus limit degradation of the coating. This solution gives good results but the welding can prove to be problematic to carry out.

Some anchoring structures exhibit fastening feet which make it possible to fasten the structure while making a space between the structure and the wall. This is the case of the anchoring structure described in document U.S. Pat. No. 4,753,053. The anchoring structure described is formed of unitary elements not exhibiting parts assembled with other elements. The object of the space between the wall and the structure is to reduce the resistance to the flow of the composite material when it is being put in place. In addition, this document does not mention the problems of corrosion encountered in the anchoring structures exhibiting assembled parts.

Document U.S. Pat. No. 6,393,789 B1 describes an anchoring structure which can be used during repair of coatings exhibiting a cellular anchoring structure. The anchoring structure described exhibits an elongated X shape and is formed by assembling two elements assembled via their central part. Each element comprises a fastening foot at the central part and optionally another foot at one of its ends. The document does not mention the problems encroaching which may take place at the junction of two anchoring elements.

There thus exists a need to improve the resistance of a coating faced with the phenomena of degradation, in particular with corrosion, in particular by sulfuridation, carbonization or oxidation, or coke formation.

The invention is targeted at overcoming these disadvantages by providing a process for the positioning of a corrosion-resistant coating on a metal wall to be protected of a fluid catalytic cracking unit, comprising:
  (i) the shaping of a metal anchoring structure,
    in which said anchoring structure is formed from a plurality of strips connected in pairs so as to form a plurality of cells between two adjacent strips, each strip being divided along its length into a plurality of portions, including at least one series of assembly portions connected to a series of assembly portions of an adjacent strip, each strip exhibiting a first longitudinal edge and a second longitudinal edge, each second longitudinal edge exhibiting a plurality of fastening tabs of a predetermined height, each fastening tab being integral with a strip portion other than an assembly portion,
    in which, during this shaping stage, the second longitudinal edges of the strips of said anchoring structure are adapted so that a free edge of each tab of the plurality of fastening tabs is in contact with said metal wall and so that a free space is defined between the said second longitudinal edge and the metal wall,
  (ii) the fastening of said anchoring structure to said metal wall, during which, for at least a part of the plurality of fastening tabs, the free edge of said fastening tabs is welded to the metal wall,
  (iii) the insertion of the composite material:
    into the cells of said anchoring structure from the metal wall and at least up to the first longitudinal edge of each strip,
    into the space separating the second longitudinal edge of each strip of the anchoring structure and the metal wall, the height of each fastening tab being sufficient for the composite material to fill this space.

The process for the positioning of the coating according to the invention makes it possible to easily install the barrier which opposes the progression and the replenishment of gaseous entities, in particular from the metal wall, in the confining spaces separating the joined portions of the strips forming the anchoring structure. As the composite material is able to extend under the assembled portions of the strips of the anchoring structure, over the whole of their length, it is possible to reduce the risks of penetration of process of gas between the anchoring structure and the chamber wall, between two juxtaposed strip portions of the anchoring structure, thus limiting the corrosion at this junction and also formation of coke, in particular on the side of the reactor. This is because the gas preferentially penetrates through cracks which are generally formed at the assembled portions. In addition, as the fastening tabs are far away from the latter, the path traveled by the gas up to the welds of the fastening tabs is relatively long, thus limiting corrosion and coke formation.

The fact that the anchoring structure is welded to the wall of the chamber via fastening tabs also makes it possible to facilitate the carrying out of the welding.

The capacity for adaptation and flexibility in terms of the respective expansion of the composite material and of the metal structure can in addition be retained. Finally, the procedures for manufacturing, shaping and installing the anchoring structure on the metal walls to be protected are similar to the existing procedures. In particular, the installation of the composite material (generally by hand) also remains unchanged with respect to the use of existing anchoring structures.

Advantageously, the anchoring structured shaped during stage (i) can exhibit fastening tabs which are distant from and not joined to the assembly portions. In other words, the fastening tabs are not contiguous with assembly portions. This can make it possible to prevent the insertion of corrosive gases between assembled portions from the fastening tab or the insertion of corrosive gases up to the fastening tab via assembled portions.

Advantageously, the anchoring structured shaped during stage (i) can exhibit fastening tabs, the length of the free edge of which is less than the length of the side of a cell of said structure. This can also make it possible to prevent the insertion of corrosive gases between assembled portions via a fastening tab (or the reverse) and can in addition facilitate the fastening, in particular by producing the length of the welds and by preventing welds from being produced at a fold of the strip. In addition, it may be made easier to produce these strips.

Advantageously, during the fastening stage (ii), the welds can be produced over the entire length of the free edge of a fastening tab.

Advantageously, during the fastening stage (ii), the welds can be produced on one face only of the fastening tab. This makes it possible to simplify the fastening of the anchoring structure without, however, harming the quality of the fastening. The weld can advantageously extend over the entire length of the free edge of the fastening tab or substantially its entire length.

The present invention is not limited by a number of fastening tabs nor to a specific shape of the cells of the anchoring structure, provided that these fastening tabs are not located on assembly portions of the strips forming the anchoring structure. However, it can be advantageous for each distinct strip portion of an assembly portion to be provided with a fastening tab, in order to make it easier to prepare and shape the strips forming the anchoring structure, in particular in order to produce strips having relatively homogeneous mechanical properties over their entire surface.

Advantageously and nonlimitingly, the metal wall on which the coating is applied can be an inner or outer wall of a cyclone, of a regenerator, of a reactor or of any other item of equipment of a fluid catalytic cracking unit, as already mentioned.

Neither is the invention limited to a specific number of fastening tabs welded to the metal wall, provided that the fastening of the anchoring structure to the metal wall is sufficiently strong for the use under consideration. Thus, for uses under severe conditions and/or on highly curved walls, it can be advantageous to weld, to the metal wall, all the fastening tabs of the anchoring structure. For other uses, only a part of the fastening tabs may be fastened to the metal wall, for example one and two.

In one embodiment, the anchoring structure shaped during stage (i) can thus exhibit cells comprising an even number of sides, for example four- or six-sided cells, and at least two fastening tabs integral with two opposite sides of each cell and, during the fastening stage (ii), two opposite fastening tabs of each cell can be welded to the metal wall. This embodiment is advantageously implied to cover an FCC regenerator wall.

In another embodiment, the anchoring structure shaped during stage (i) can exhibit cells exhibiting an even number of sides, for example six sides, each cell exhibiting at least two opposite sides formed by assembly portions of these strips of the anchoring structure and fastening tabs integral with the other sides and, during the fastening stage (ii), all the fastening tabs of each cell can be welded to the metal wall. This embodiment is advantageously employed to cover a reactor wall in a stripping region.

In addition, the invention is not limited to a specific shape of the cells of the anchoring structure. These cells can exhibit an even number of sides, for example four, six, eight, nine, indeed even exhibit an uneven number of sides.

The first longitudinal edge of the anchoring structure advantageously defines a single plane. However, in order to further limit the penetration of corrosive gas between the assembly portions, the positioning of process according to the invention can additionally employ anchoring structures exhibiting a first longitudinal edge (not fastened to the metal wall) having a complex specific shape.

Thus, the first longitudinal edge can be similar to the upper longitudinal edge described in document WO2014/009625.

In a specific embodiment, the first longitudinal edge of each strip of the anchoring structure shaped during the stage (i) can thus be formed, before the shaping, from a succession of straight sections which are parallel to a plane defined by the second longitudinal edge, bottom sections distant from the second longitudinal edge by a distance h alternating with top sections distant from the second longitudinal edge by a distance H greater than the distance h, at least a part of the bottom sections forming the first edge of a part at least of the assembly portions so that, when two adjacent strips are assembled, each assembly portions of a strip comprises a first longitudinal edge distant from the second longitudinal edge by a distance different from the distance separating the first longitudinal edge from the second lower longitudinal edge of the assembly portion of the adjacent strip with which it is assembled, at least over a part of the length of the assembled assembly portions, advantageously over their entire length.

During the stage (iii) of insertion of the composite material into the cells of said anchoring structure, the composite material then fills the cells from the metal wall and at least up to the top sections of the first longitudinal edges of the strips of the anchoring structure. Such a covering of the anchoring structure by a composite material up to the height H of the top sections of the first longitudinal edge, above the height h of the bottom sections of the first longitudinal edge, can make it possible to prevent the penetration of the fluid, in particular of a gas, via the first longitudinal edge of the juxtaposed assembly portions, while making it possible to obtain an anchoring structure having homogeneous mechanical properties over the whole of its surface as a result of the alternation of the top and bottom sections, so that the stresses generated by the shaping thereof will be homogeneous.

In another specific embodiment, the first longitudinal edge of each strip of the anchoring structure shaped during stage (i) can exhibit, before the shaping, a plurality of delimitation tabs integral with strip portions other than assembly portions, each delimitation tab exhibiting a delimitation edge distant by a predetermined distance from a plane defined by the first longitudinal edge,
   during the stage (iii), the composite material is applied
      over a thickness sufficient to cover or be flush with the
      delimitation edge of the delimitation tabs.

Such a delimitation tab will act as marker during the application of the composite material, it being possible for the worker to smooth the composite material at the level of the delimitation edge of this delimitation tab with the smoothing tool (float or trough). In this way, the remainder of the anchoring element, in particular the remainder of the upper edge, located further back with respect to the delimitation tab, is covered with a layer of composite material at least equal to the predetermined distance, making it possible to limit the formation of interstices allowing the passage of the corrosive gases.

The composite material, within the meaning of the present invention, is preferably a material resulting from an assembling of at least two immiscible materials having a high adhesion capacity. Preferably, the composite material is a composite construction material, such as a concrete, in particular a concrete suitable for use in a fluid catalytic cracking unit, for example a concrete exhibiting a high resistance to abrasion and to high temperatures.

Another subject matter of the invention relates to a metal wall equipped with a corrosion-resistant coating capable of being positioned according to the process according to the invention, said wall exhibiting a face covered with a corrosion-resistant coating comprising:
   a cellular anchoring structure welded to the wall,
   a composite material filling the cells of the anchoring
      structure,
in which:
   the anchoring structure is formed from a plurality of strips
      assembled in pairs so as to form a plurality of cells
      between two adjacent strips, each strip being divided
      along its length into a plurality of portions, including at
      least one series of assembly portions assembled with a
      series of assembly portions of an adjacent strip, each
      strip exhibiting a first longitudinal edge and a second
      longitudinal edge, each second longitudinal edge
      exhibiting a plurality of fastening tabs, each tab being
      integral with a strip portion other than an assembly portion, a free edge of each tab of the plurality of fastening tabs being in contact with said metal wall in order to define a space between said second longitudinal edge and the metal wall, the free edge of at least some of the fastening tabs being welded to the metal wall, the composite material fills the cells from the metal wall and at least up to the first longitudinal edge of each strip and fills in the space separating the second longitudinal edge of each strip of anchoring structure and the metal wall, the height of each fastening tab being sufficient for the composite material to fill the space.

Another subject matter of the invention is a chamber of a fluid catalytic cracking unit comprising at least one inner or outer metal wall according to the invention.

This chamber can be a chamber of a cyclone, of a regenerator, of a disengage or of any other item of equipment a fluid catalytic cracking unit, as already mentioned.

The invention is now described with reference to the appended nonlimiting drawings, in which:

FIGS. 4a and 4b are diagrammatic representations in section of the anchoring structure represented in FIG. 3 along the lines A-A and B-B, after fastening of the anchoring structure to a metal wall and insertion of the composite material;

FIG. 5 is a side-face view, before shaping according to stage (i) of the process, of a strip of an anchoring structure similar to that represented in FIG. 1 according to a first alternative form;

FIG. 6 is a side-face view of a strip of an anchoring structure similar to that represented in FIG. 1 according to a second alternative form.

Figure 1:
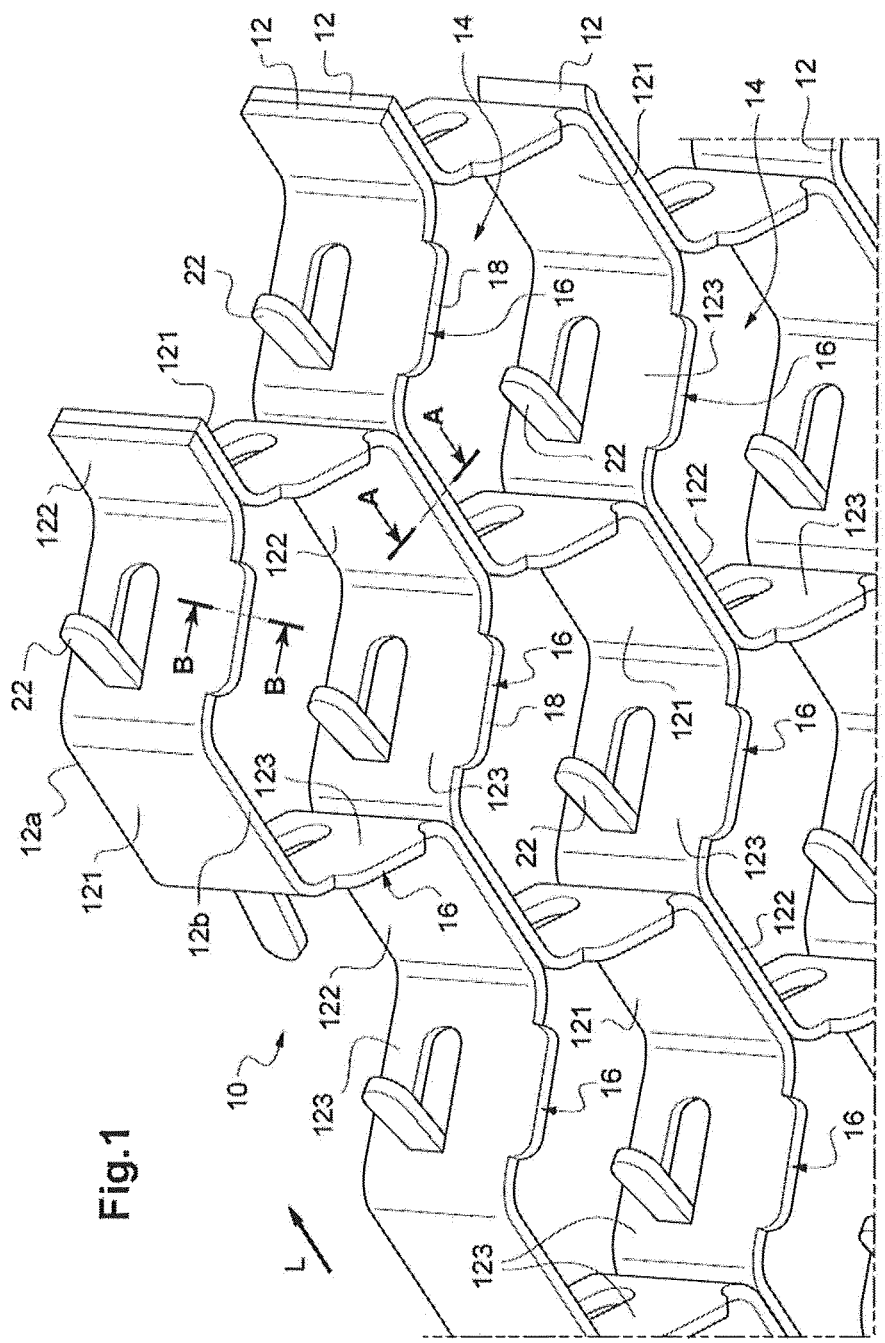
FIG. 1 is a representation in bottom view perspective of anchoring structure which can be used in an embodiment of the process of the invention.

FIG. 1 represents a metal anchoring structure 10 of the honeycomb type formed from a plurality of strips 12 assembled in pairs so as to form a plurality of hexagonal cells 14 connected to one another via their sides.

Strip is understood to mean a strip of metallic material exhibiting a width which is less than a length and a thickness which is less than the width. Generally, each longitudinal edge defines at least one plane before the shaping described in the process of the invention. Preferably, the longitudinal edges of the strip are parallel before this shaping. In the present description, the length of an element is defined according to the longitudinal direction of the strip.

By way of example, the internal dimensions of the cells can range from 4 to 6 cm for a thickness of approximately 1.5 to 3.0 cm, for example of 2 cm.

In this embodiment, each strip 12, made in one piece, is divided along its length into a plurality of portions 121, 122, 123:

first strip portion 121 which extend in a first plane parallel to the longitudinal direction L of the strip,
second strip portions 122 which extend in a second plane parallel to the first plane and distinct from the latter,
third strip portions 123 which each connect a first strip portion 121 to a second strip portion 122.

Each strip can be made by folding a flat strip along a direction perpendicular to its longitudinal direction (L), in the plane of the strip. The different portions 121, 122 and 123 are thus separated by folds.

The first 121 and second 122 strip portions are alternated over the entire length of the strip 12 and the first portion 121 of a strip are juxtaposed and assembled with the second portions 122 of an adjacent strip 12 by fastening means. The first 121 and second 122 strip portions form assembled portions with an adjacent strip 12.

Currently, the different specifications require a maximum gap of the order of 0.2 mm between two assembled strip portions. However, the invention is not limited to a specific gap.

Figure 2:
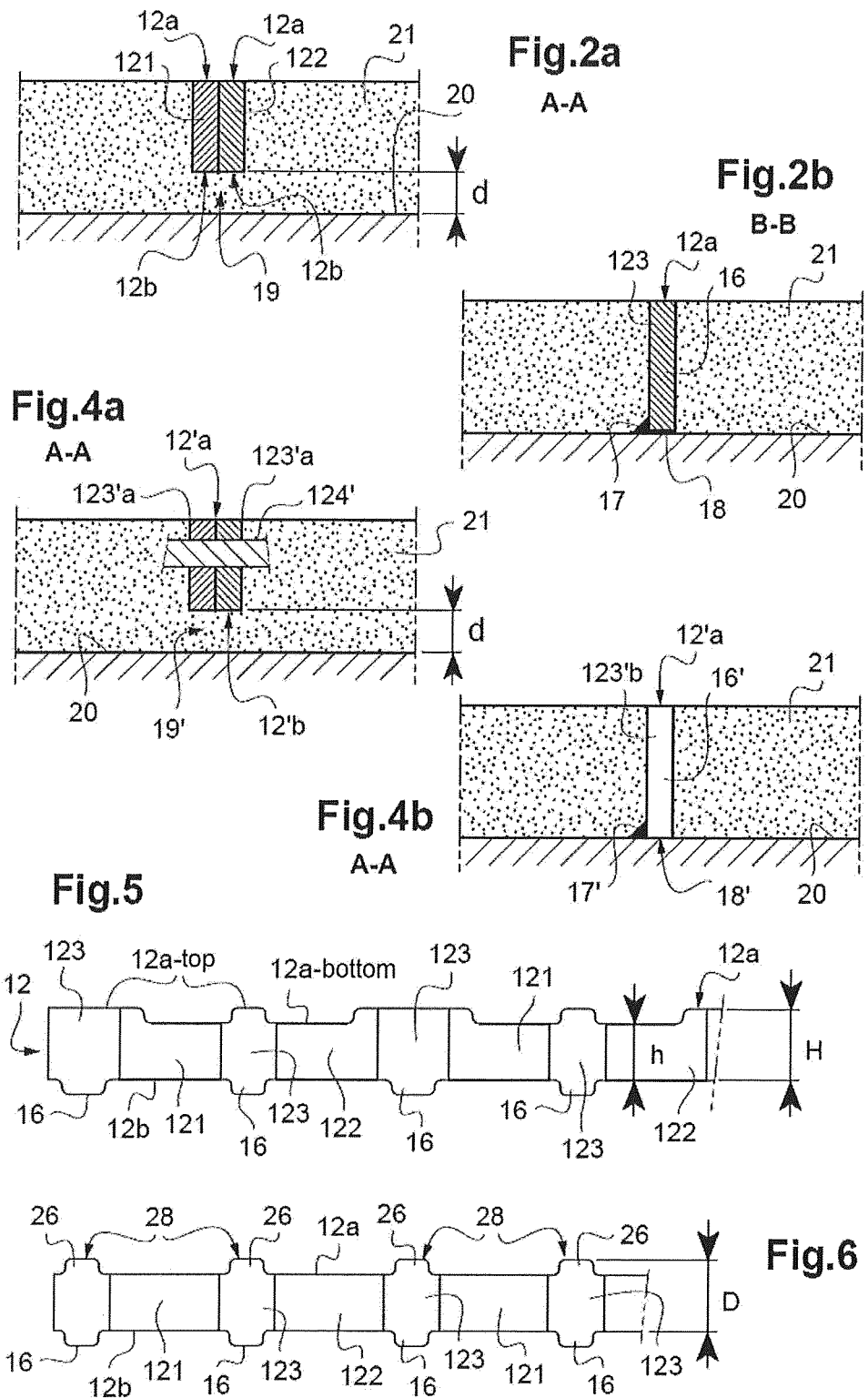
FIGS. 2a and 2b are diagrammatic representations in section of the anchoring structure represented in FIG. 1 along the lines A-A and B-B, after fastening of the anchoring structure to a metal wall and insertion of composite material.

The anchoring structure 10 is formed from a plurality of identical strips 12. Each strip 12 exhibits a first longitudinal edge 12a and a second longitudinal edge 12b parallel to the first longitudinal edge 12a. In this embodiment, the first and second longitudinal edges each extend in a single plane before the shaping of the anchoring structure. The second longitudinal edge 12b is in this instance the edge intended to be applied against a metal wall and fastened to the latter, as represented in FIGS. 2a and 2b. To this end, each second longitudinal edge 12b of the anchoring structures 10 exhibits a plurality of fastening tabs 16, each tab being integral with a strip portion 123 distinct from an assembly portion 121, 122. In particular, each fastening tab 16 exhibits a free edge 18 intended to be applied against a metal wall 20 (FIGS. 2a, 2b). Each fastening tab exhibits a predetermined height d (measured along a direction perpendicular to the longitudinal direction of a strip). In other words, the fastening tab 16 projects by a distance d from the plane defined by the second longitudinal edge 12b.

In this example, the fastening tabs 16 are made in one piece of each strip 12 and they extend in the same plane as the portion 123 with which they are integral. They are advantageously identical in order for the thickness of the layer of composite material extending under the second longitudinal edge 12b to be substantially constant over the entire surface of the anchoring structure 10.

As represented in FIG. 1, each strip 12 can additionally exhibit a flap of material 22 cut out from at least one portion other than an assembly portion (FIG. 3, in this instance, a portion 123) and forwarded in order to project from this portion. Such a configuration can make it possible to improve the anchoring according to the material to the anchoring element, the flap then being embedded in the composite material, the maintenance of which is also reinforced as a result of fact that it passes through the orifice released by the folded-back flap.

The flaps 22 of material resulting from portions forming part of the same cells can be folded back toward one another. This arrangement makes it possible to obtain two flaps folded back toward the center of each cell when the strips are assembled together.

These flaps 22 can also be folded back so as to extend substantially parallel to the planes of the strip assembly portions.

According to a first embodiment, the process of the invention can thus be carried out in the following way:

(i) the anchoring structure 10 represented in FIG. 1 is shaped. To this end, the second longitudinal edges 12b are adapted in order for the free edge 18 of each tab of the plurality of fastening tabs 16 to be in contact with the metal wall 20, in order to define a free space 19 between the second longitudinal edge 12b and the metal wall 20 (FIGS. 2a, 2b), (ii) the anchoring structure 10 is fastened to the metal wall by welding, to the metal wall 20, the free edge 18 of a part at least of the fastening tab 16, (iii) a composite material 21 is inserted into the cells 14 of the anchoring structure 10 from the metal wall 20 and at least up to the first longitudinal edge 12*a* of each strip, the space 19 being filled.

It should be noted here that the distance d separating the second longitudinal edge 12*b* from the metal wall 20 at this free space 19 (FIG. 2*a*) corresponds to the height of the fastening tab 16. The height of the fastening tab 16 will thus advantageously be determined in order to allow the composite material 21 to flow between the second longitudinal edge 12*b* and the metal wall 20 and to thus make it possible to fill in the space 19, as represented in FIG. 2*a*. By way of example, the distance d can be of the order of 3 to 7 mm.

In this example, one fastening tab 16 out of two, preferably two opposite fastening tabs, or all of the fastening tabs 16 can be welded to the metal wall 20.

As represented in FIG. 2*b*, only one face of the fastening tabs 16 may be welded to the metal wall by a welding bead 17. However, it can be envisaged to produce a welding bead on each face of the fastening tab 16, although this is undesirable and expensive.

It should be noted that the length of the free edge 18 of the fastening tab 16 is in this instance less than the length of the portion 123 with which each fastening tab 16 is integral.

The anchoring structure 10 represented in FIG. 1 is thus shaped before it is fastened to the metal wall 20, for example by rolling, in order to follow the shape of this metal wall.

When the metal wall to be protected exhibits a more complex shape, it may then be difficult, indeed even possible, to fasten an anchoring structure of the type of that described with reference to FIG. 1. Use may then be made of an articulated anchoring structure, of the type of that described with reference to FIG. 3.

Figure 3:
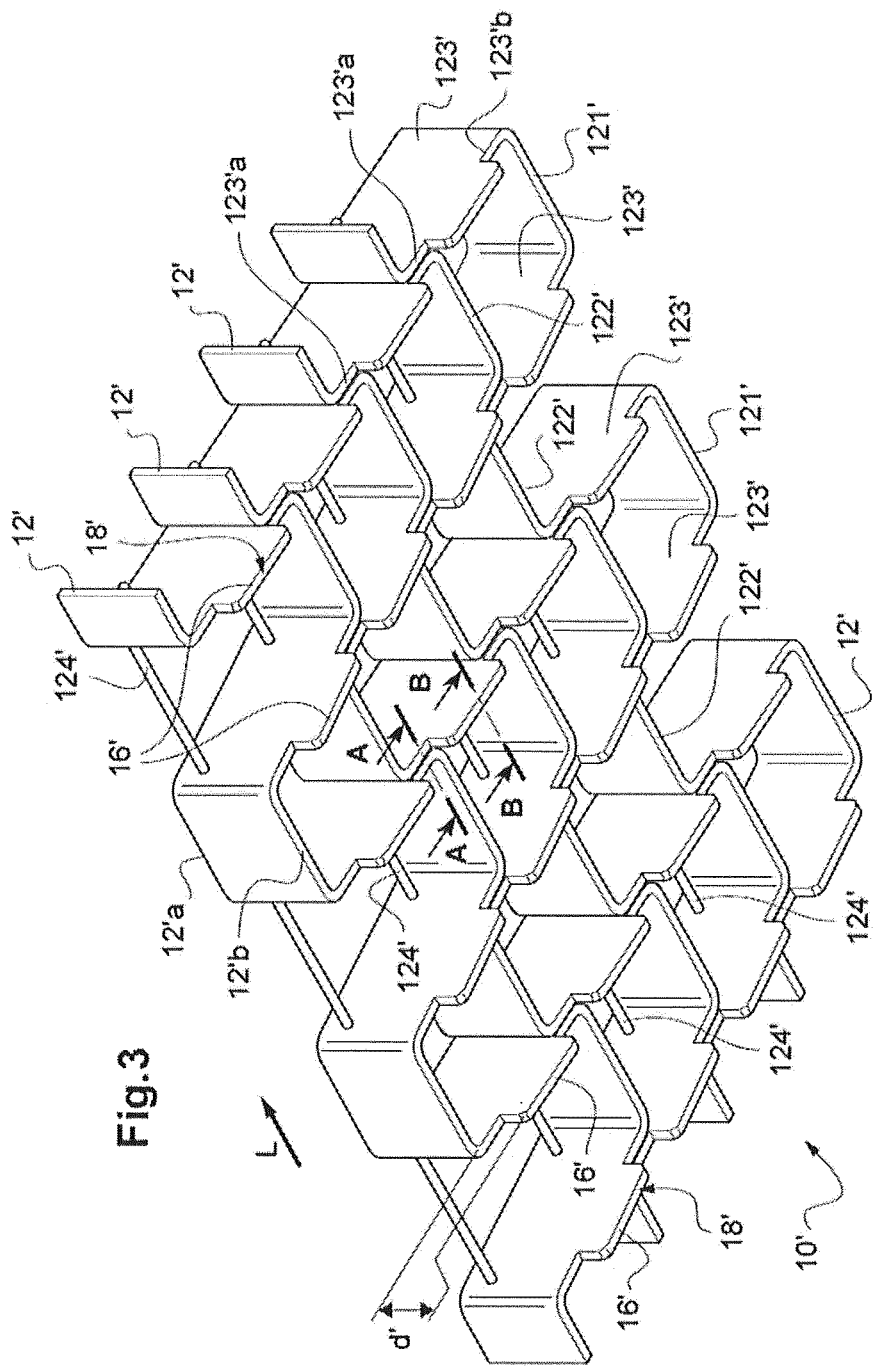
FIG. 3 is a representation in bottom view perspective of another anchoring structure which can be used in an embodiment of the process of the invention.

FIG. 3 represents an metal anchoring structure 10' of honeycomb type formed from a plurality of strips 12' assembled in pairs so as to form a plurality of four-sided cells 14'.

The term "strip" has the same meaning as that already given. These strips can be prepared as already described with reference to FIG. 1.

As in the preceding embodiment, each strip 12', made in one piece, is divided along its length into a plurality of portions 121', 122', 123':
the first strip portions 121' which extend in a first plane parallel to the longitudinal direction L of the strip,
the second strip portions 122' which extend in a second plane parallel to the first plane and distinct from the latter,
the third strip portions 123' which each connect a first strip portion 121' to a second strip portion 122'.

The first 121' and second 122' strip portions are alternating over the entire length of a strip 12'. In this instance, each first portion 121' bracketed together with two third portions 123' of one and the same strip exhibits a U shape which is partially nested in the U-shape of each first portion 121' bracketed together with two third portions 123' of an adjacent strip, so that the third portions 123' of two adjacent anchoring elements are partially juxtaposed, forming four-sided cells (FIG. 4). The hollows of the U shapes thus defined are all directed in one and the same direction. Each third portion 123' thus exhibits:
a part 123'*a* juxtaposed with a part 123'*a* of a portion 123' of an adjacent strip,
a nonjuxtaposed part 123'*b*.

These juxtaposed parts 123'*a* of the third portions 123' of adjacent strips form assembled portions within the meaning of the invention and in addition are traversed by a rod 124' extending in the longitudinal direction L of the strips. It should be noted that, in this embodiment, the assembly portions 123'*a* extend into the continuation of portions 123'*b* other than assemble portions and are not separated by folds, as in the embodiment of FIG. 1.

An articulated anchoring structure 10' is obtained, it being possible for each strip 12' to pivot with respect to an adjacent strip 12' by the rotation around a rod 124'.

The anchoring structure 10' represented is in this instance formed from a plurality of identical strips 12'. Each strip 12' exhibits, before shaping, a first longitudinal edge 12'*a* present in a single plane and the second longitudinal edge 12'*b* parallel to the first longitudinal edge 12'*a* and also present in a single plane.

The second longitudinal edge 12'*b* of each strip 12' forms a fastening edge of the anchoring structure 10'. To this end, each second longitudinal edge 12'*b* of the anchoring structure 10' exhibits a plurality of fastening tabs 16', each tab being integral with a strip portion 123'*b* other than an assembly portion 123'*a*. In particular, each fastening tab 16' exhibits a free edge 18' intended to be applied against a metal wall. These fastening tabs 16' have a height d', of the same order of magnitude as the height d of the fastening tabs of the preceding embodiment.

In this example, the fastening tab 16' extends over part of the length of the tab 123'*b*, up to the part 123'*a*. However, it is generally preferably for the fastening tab 16' not to be contiguous with the part 123'*a*.

As in the preceding embodiment, the fastening tab 16' are made in one piece with each strip 12', in the extension and the same plane as the portion 123' with which they are integral.

The process according to the invention can be carried out in the following way:
(i) shaping of the anchoring structure 10', during which the second longitudinal edges 12'*b* of the strips of the anchoring structure are adapted in order for a free edge 18' of a part at least of the fastening tabs 16' to be in contact with the metal wall 20 in order to define a space 19' between the second longitudinal edge and the metal wall 20 (FIGS. 4*a* and 4*b*),
(ii) the fastening of the anchoring structure 10' to the metal wall by means of the fastening tab 16', the free edge 18' of the fastening tab 16' being welded to the metal wall,
(iii) insertion of a composite material 21:
into the cells 14' of the anchoring structure 10' for the metal wall 20 and at least up to the first longitudinal edge 12'*a* of each strip,
into the space 19' separating the second longitudinal edge 12'*b* of the anchoring structure and the metal wall, the height of each fastening tab being sufficient for the composite material to fill this space.

FIGS. 4*a* and 4*b* show the space 19' filled with composite material 21 and the welding bead 17' rendering a fastening tab 16' integral with a metal wall 20.

In order to further limit the penetration of gas between the assembly portions of two adjacent strips, the first longitudinal edges can exhibit a specific shape, described below with reference to FIGS. 5 and 6.

In particular, the first longitudinal edge of each strip may not define a single plane but two planes, by alternation of top and bottom sections over the entire length of the first longitudinal edge.

Such a shape is, for example, described in document WO2014/009625, the content of which is incorporated by way of reference. FIG. 5 represents in profile a strip 12 of an anchoring structure of the type of that described with reference to FIGS. 1 and 2a, 2b, ready to be assembled with another identical strip in order to form cells. In other words, the shape of the strip 12 is similar to the shape of the strips represented in FIG. 1. The portions 121, 122 and 123 are thus identical or substantially identical in order to form hexagonal cells, the portions 123 appearing smaller in FIG. 5 as a result of the shape of the strip 12.

As may be seen in FIG. 5, the first longitudinal edge 12a exhibits top sections 12a_top and bottom sections 12a_bottom with heights H and h respectively with respect to the plane defined by the second longitudinal edge 12b. By way of example, the difference H-h between the distances H and h is, for example, from 2 to 10 mm, for example from 3 to 10 mm, indeed even from 4 to 10 mm, preferably from 3 to 4 mm. Such a difference in the distances is generally sufficient to make it possible covering by composite material of the space existing between the portions of two juxtaposed and assembly adjacent strips and to thus prevent the penetration of a fluid into the space.

The first edge 12a can exhibit one of the following configurations, not represented, which are particular simple to produce:
 the bottom sections 12a_bottom can extend over the entire length of each first portion 121 and the top sections 12a_top can extend over the entire length of each second portion 122, or vice versa, or
 each first portion 121 can exhibit a bottom section 12a_bottom and a top section 12a_top and each second portion 122 can exhibit a bottom section 12a_bottom with the same amount as the top section 12a_top of a first portion 121 and a top section 12a_top with the same length as the bottom section 12a_bottom of a first portion 121.

The two top and bottom sections of an assembly portion (for example of a first or second portion) can be of the same length or preferably of different length, which makes it possible to prevent any overlapping between the top sections of the assembled assembly portions of two juxtaposed strips. This is because an overlapping might promote the introduction of gas between the assembled portions, which is not desirable.

The first longitudinal edge of the strip portions located between the assembly portions can advantageously be distant by the distance H from the second lower longitudinal edge.

In another alternative form, the first longitudinal edge of each strip can also exhibit a delimitation tab as represented in FIG. 6. FIG. 6 is a view in profile, similar to the view of FIG. 5, representing a strip 12 of an anchoring structure defining six-sided cells. As can be seen, the first longitudinal edge 12a of the strip 12 exhibits, before the shaping, a plurality of delimitation tabs 26 integral with the strip portions 123 other than assembly portions 121, 122. Each delimitation tab 26 exhibits a delimitation edge 28 distant by a predetermined distance D from the plane defined by the second longitudinal edge 12b.

The predetermined distance D can be chosen so that, once dry, the composite material of concrete type is always flush with the delimitation edge 28 of the delimitation tab or tabs 26. In other words, the delimitation tabs 26 must not project from the surface of the composite material. By way of example, this distance can be at least 2 mm, for example less than or equal to 10 mm, preferably less than or equal to 6 mm, indeed even less than or equal to 3 mm.

Each delimitation tab 26 can extend at most over ½, or at most ⅔, or at most ¼ of the length of the edge of the strip portion with which it is integral, in order to limit the potential regions for introduction of the gas. This is because it is sufficient for the delimitation tab to project from the upper edge in order to be able to be spotted by the worker applying composite material. By way of example, the length of the delimitation tab and in particular of its delimitation edge is from 10 to 22 mm.

Each delimitation tab 26 can be positioned at the middle of said edge of the portion of which it is integral, which can simplify the preparation of the anchoring element.

As for the fastening tab 16, the delimitation tab 26 is preferably made in one piece with the strip 12.

It should be noted that the embodiments described with reference to FIGS. 5 and 6 are applicable to the anchoring structures of the type that described with reference to FIG. 3, or to any other anchoring structure exhibiting cells.

Generally, whatever the shape of the anchoring structure, or the strips of anchoring structure used in the stage (i) can be identical. This can make it possible to obtain an anchoring structure having particularly homogeneous mechanical properties over the whole of its surface as a result of the use of identical strips, so that the stresses generated by its shaping will be particularly homogeneous and that the anchoring structure will exhibit a good deformability. The use of identical strips also makes it possible to reduce the manufacturing costs.

Whatever its shape, an anchoring structure used in the process according to the invention can advantageously made of stainless steel (if stainless steel contains at most 1.2% by weight of carbon and at least 10.5% by weight of chromium according to standard EN10008). In particular, the stainless steel can be chosen so as to withstand the environment of the chamber in which the anchoring structure has to be used.

In some applications, for example as coating in regenerative cyclones, serious degradations of the stainless steel used for honeycomb structures have been observed.

It would appear that, under the external layer of chromium oxide, the chromium content of the steel decreases during use until a value of 10.5% by weight is reached. In point of fact, a steel uses its stainless nature when its chromium content is less than 10.5% by weight: rapid oxidation of the steel can then occur.

In addition, the formation of carbides has also been observed and appears to have in the course of microcracks inside the steel.

In order to avoid or delimit this type of degradation, the strips of the anchoring structure used in stage (i) can advantageously be made of austenitic stainless steel, for example chosen from the following steels:
 a steel containing from 0.04 to 0.10% by weight of carbon, from 17 to 19% of chromium and from 9 to 12% of nickel, and with a niobium content of from 8 times the carbon content of 1% by weight, for example a steel of AISI 347 grade,
 a steel containing at most 0.015% by weight of carbon, from 15 to 17% of chromium and from 33 to 37% of nickel, for example a steel of AISI 330 grade,
 a steel containing from 0.10% by weight of carbon, from 24 to 26% of chromium and from 19 to 22% of nickel, for example a steel of AISI 310 grade, a stainless steel containing from 0.04 to 0.10% by weight of carbon, from 18 to 20% of chromium and from 8 to 10% of nickel, for example a steel of AISI 304H grade, a stainless steel containing from 0.04 to 0.10% by weight of carbon, from 22 to 24% of chromium and from 12 to 15% of nickel, for example a steel of 309H grade, a steel containing at most 0.08% by weight of carbon, from 17 to 19% of chromium and from 9 to 12% of nickel, for example a steel of 321 grade.

The invention claimed is:

1. A process for the positioning of a corrosion-resistant coating on a metal wall to be protected of a fluid catalytic cracking unit, comprising:
   (i) the shaping of a metal anchoring structure,
      in which the anchoring structure is formed from a plurality of strips connected in pairs so as to form a plurality of cells between two adjacent strips, each strip being divided along its length into a plurality of portions, including at least one series of assembly portions connected to a series of assembly portions of an adjacent strip, each strip exhibiting a first longitudinal edge and a second longitudinal edge, each second longitudinal edge exhibiting a plurality of fastening tabs of a predetermined height, each fastening tab being integral with a strip portion other than an assembly portion, wherein the fastening tabs are distant from and not contiguous to the assembly portions;
      in which, during this shaping stage, the second longitudinal edges of the strips of the anchoring structure are adapted so that a free edge of each tab of the plurality of fastening tabs is in contact with the metal wall and so that a free space is defined between the the second longitudinal edge and the metal wall,
   (ii) the fastening of the anchoring structure to the metal wall, during which, for at least a part of the plurality of fastening tabs, the free edge of the fastening tabs is welded to the metal wall,
   (iii) the insertion of a composite material:
      into the cells of the anchoring structure from the metal wall and at least up to the first longitudinal edge of each strip,
      into the space separating the second longitudinal edge of each strip of the anchoring structure and the metal wall, the height of each fastening tab being sufficient for the composite material to fill this space, wherein the anchoring structure shaped during stage (i) exhibits hexagonal cells exhibiting an even number of sides, and at least two fastening tabs integral with two opposite sides of each hexagonal cell, in which, during the fastening stage (ii), two opposite fastening tabs of each hexagonal cell are welded to the metal wall.

2. The process for the positioning of a corrosion-resistant coating as claimed in claim 1, in which the anchoring structure shaped during stage (i) exhibits fastening tabs, the length of the free edge of which is less than the length of a side of a cell of the structure.

3. The process for the positioning of a corrosion-resistant coating as claimed in claim 1, in which, during the fastening stage (ii), the welds are produced over the entire length of the free edge of a fastening tab.

4. The process for the positioning of a corrosion-resistant coating as claimed in claim 1, in which, during the fastening stage (ii), the welds are produced on one face only of a fastening tab.

5. The process for the positioning of a corrosion-resistant coating as claimed in claim 1, in which the anchoring structure shaped during stage (i) exhibits cells exhibiting an even number of sides, each hexagonal cell exhibiting at least two opposite sides formed by assembly portions of the strips of anchoring structure and fastening tabs integral with the other sides, in which, during the fastening stage (ii), all the fastening tabs of each cell are welded to the metal walls.

6. The process for the positioning of a corrosion-resistant coating as claimed in claim 1, in which:
   the first longitudinal edge of each strip of the anchoring structure shaped during the stage (i) is formed, before the shaping, from a succession of straight sections which are parallel to a plane defined by the second longitudinal edge, bottom sections distant from the second longitudinal edge by a distance h alternating with top sections distant from the second longitudinal edge by a distance H greater than the distance h, at least a part of the bottom sections forming the first edge of a part at least of the assembly portions so that, when two adjacent strips are assembled, each assembly portions of a strip comprises a first longitudinal edge distant from its second longitudinal edge by a distance different from the distance separating the first longitudinal edge from the second longitudinal edge of the assembly portion of the adjacent strip with which it is assembled, at least over a part of the length of the assembled assembly portions,
   during the stage (iii) of insertion of the composite material, the composite material fills the cells from the metal wall and at least up to the top sections of the first longitudinal edges of the strips of the anchoring structure.

7. The process for positioning a corrosion-resistant coating as claimed in claim 1, in which:
   the first longitudinal edge of each strip of the anchoring structure shaped during stage (i) exhibits, before the shaping, a plurality of delimitation tabs integral with strip portions other than assembly portions, each delimitation tab exhibiting a delimitation edge distant by a predetermined distance (D) from a plane defined by the first longitudinal edge,
   during the stage (iii), the composite material is applied over a thickness sufficient to cover or be flush with the delimitation edge of the delimitation tabs.

8. A metal wall equipped with a corrosion-resistant coating capable of being positioned according to the process as claimed in claim 1, the wall exhibiting a face covered with a corrosion-resistant coating comprising:
   a cellular anchoring structure welded to the wall,
   a composite material filling the cells of the anchoring structure,
   in which:
   the anchoring structure is formed from a plurality of strips assembled in pairs so as to form a plurality of cells between two adjacent strips, each strip being divided along its length into a plurality of portions, including at least one series of assembly portions assembled with a series of assembly portions of an adjacent strip, each strip exhibiting a first longitudinal edge and a second longitudinal edge, each second longitudinal edge exhibiting a plurality of fastening tabs, each fastening tab being integral with a strip portion other than an assembly portion, a free edge of each tab of the plurality of fastening tabs being in contact with the metal wall in order to define a space between the second longitudinal edge and the metal wall, the free edge of at least some of the fastening tabs being welded to the metal wall,
   the composite material fills the cells from the metal wall and at least up to the first longitudinal edge of each strip and fills in the space separating the second longitudinal edge of each strip of anchoring structure and the metal wall, the height of each fastening tab being sufficient for the composite material to fill the space.

9. A chamber of a fluid catalyst cracking unit, characterized in that it comprises comprising at least one inner or outer metal wall as claimed in claim 8.

* * * * *